R. O. McCLURE & H. P. JOHNSON.
VEHICLE ATTACHMENT.
APPLICATION FILED NOV. 8, 1913.
1,124,932.
Patented Jan. 12, 1915.
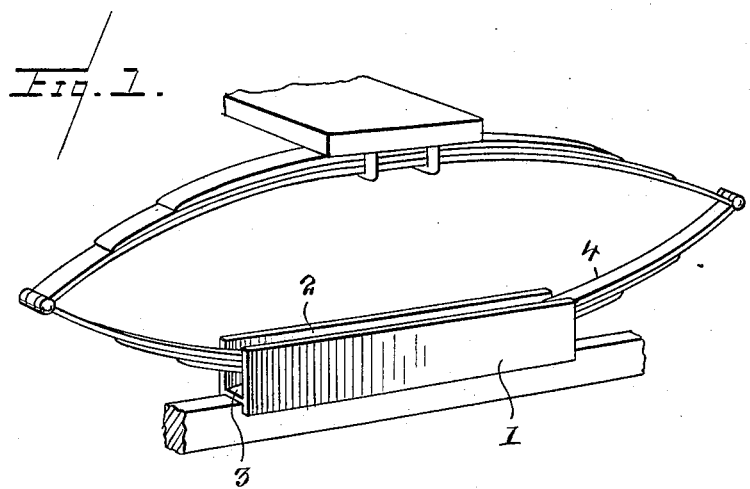
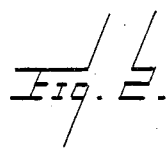
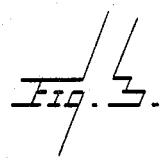
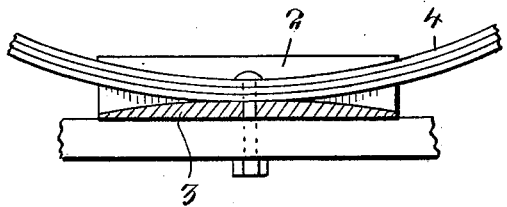
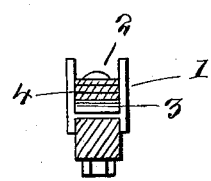

ary but
UNITED STATES PATENT OFFICE.

ROBERT O. McCLURE AND HENRY P. JOHNSON, OF FRANKS, OKLAHOMA.

VEHICLE ATTACHMENT.

1,124,932.   Specification of Letters Patent.   Patented Jan. 12, 1915.

Application filed November 8, 1913. Serial No. 799,969.

*To all whom it may concern:*

Be it known that we, ROBERT O. MCCLURE and HENRY P. JOHNSON, citizens of the United States, residing at Franks, in the county of Pontotoc and State of Oklahoma, have invented new and useful Improvements in Vehicle Attachments, of which the following is a specification.

This invention relates to vehicle attachments and it consists in the novel features hereinafter described and claimed.

An object of the invention is to provide an attachment in the form of a block adapted to be applied to a body or running gear of a vehicle for the purpose of restraining the springs of the vehicle from moving laterally.

With the above object in view the attachment consists of a block having a channel at one side disposed longitudinally thereof the ends of the channel opening at the ends of the block. The said channel is adapted to receive a portion of the spring and the block is fixed to the body or running gear or any other suitable part of the vehicle. The spring is free to contract and expand vertically but the block prevents the spring from moving edgewise or swinging laterally as above indicated. The bottom wall of the channel is convex longitudinally in order that the spring may contract and expand as above indicated.

In the accompanying drawing:—Figure 1 is a perspective view of the attachment applied to a spring. Figs. 2 and 3 are detailed views of the features of the device.

The attachment comprises a block 1 which is adapted to be applied to the body, running gear or axle of a vehicle and the said block 1 is provided with a channel 2 located at one side of the block and disposed longitudinally thereof. The ends of the channel 2 open at the ends of the block and the bottom wall of the channel 2 is convex longitudinally. The bottom wall of the channel is indicated at 3. When the block is in position upon a suitable part of the vehicle the channel 2 receives a portion of the spring 4 and therefore it will be seen that when the vehicle is in motion the spring 4 may contract and expand vertically but the side walls of the channel 2 will prevent the spring from tilting or swinging laterally. Furthermore the convexed bottom wall 3 of the channel will permit the spring 4 to rock or tilt longitudinally and thus the resiliency of the spring 4 is preserved in so far as it is adapted to permit the body of the vehicle to move vertically with relation to the running gear also the body may move in a direction longitudinally of the spring with relation to the running gear but the body is restrained against movement transversely of the spring with relation to the running gear. Therefore when the running gear is making a turn the body will remain in its normal position above the same and will not move or swing out of its normal position toward the wheels at one side or the other of the running gear. However the body is free to move vertically and as the vehicle travels over the ground the body may move in a forward or rear direction with relation to the running gear to absorb the shock incident to passing over rough places in the road.

Having described the invention what is claimed is:—

A vehicle attachment comprising a block provided at its opposite sides with channels which open at their ends at the ends of the block, one of the said channels being adapted to receive between its side walls a portion of the spring of the vehicle said channel having a curved bottom, and the other channel adapted to receive between its side walls a part of the vehicle and having a flat bottom the first mentioned channel being deeper than the second mentioned channel.

In testimony whereof we affix our signatures in presence of two witnesses.

ROBERT O. McCLURE.
HENRY P. JOHNSON.

Witnesses:
D. L. BRADSHAW,
A. L. BRATCHER.

Copies of this patent may be obtained for five cents each, by addressing the "Commissioner of Patents, Washington, D. C."